United States Patent [19]
Chandor

[11] 3,771,493
[45] Nov. 13, 1973

[54] LITTER AND WASTE RECEPTACLE FOR SMALL PET ANIMALS

[76] Inventor: Keith F. Chandor, Lee's Hill Rd., Basking Ridge, N.J. 07920

[22] Filed: May 30, 1972

[21] Appl. No.: 258,131

[52] U.S. Cl............................. 119/1, 4/112, 4/142
[51] Int. Cl............................................. A47k 11/02
[58] Field of Search ................... 119/1; 4/112, 142, 4/138, 116; 220/60 R

[56] References Cited
UNITED STATES PATENTS

| | | | |
|---|---|---|---|
| 3,249,950 | 5/1966 | Wilson | 4/112 |
| 3,428,967 | 2/1969 | Hughes | 4/142 |
| 1,510,061 | 9/1924 | Jones | 4/138 |
| 3,002,194 | 10/1961 | Wuest | 4/142 X |
| 3,600,719 | 8/1971 | Karr | 4/116 |
| 3,579,655 | 5/1971 | Sundberg | 4/142 X |
| 3,142,847 | 8/1964 | Kurrels | 4/142 |
| 3,495,278 | 2/1970 | Peters | 4/142 |
| 3,484,875 | 12/1969 | Eisenberg | 4/142 |
| 3,326,408 | 6/1967 | Ringlen | 220/60 R |
| 3,077,608 | 2/1963 | Renje | 4/142 |

*Primary Examiner*—Louis G. Mancene
*Assistant Examiner*—J. A. Oliff
*Attorney*—Samuel J. Stoll et al.

[57] ABSTRACT

A litter and waste receptacle for small pet animals such as cats, comprising a basin, a liner in the basin having the configuration, and performing the function, of a removable, disposable and replaceable receptacle for litter and waste, and a cover removably mounted on the basin and detachably securing the liner thereto, the cover having an opening formed therein for ingress and egress, said opening being shaped to position an animal in proper orientation relative to the basin, said cover having the configuration, and performing the function, of a deflector to prevent scattering of the litter and waste under conditions of normal use.

4 Claims, 4 Drawing Figures

PATENTED NOV 13 1973          3,771,493

LITTER AND WASTE RECEPTACLE FOR SMALL PET ANIMALS

BACKGROUND OF THE INVENTION

1. Field of the Invention

Litter and waste receptacles for indoor care of small pet animals, such as cats.

2. Description of the Prior Art

The closest prior art known to applicant consists of the following U. S. Pat. Nos. 2,469,784, Quinn; 2,741,223, Winborn; 3,310,031 Lowe; 3,358,647 Wilson; 3,377,990 Mitchell; 3,416,495 Wilson;

Thse patents do not, however, disclose the use of a removable, disposable and replaceable liner which has the configuration, and performs the function, of a receptacle for litter and waste.

Nor do these patents disclose the use of a cover which is detachably secured to a basin, said cover having an elliptical or equivalent opening formed therein and performing at least the following three functions:
a. Securing the liner to the basin,
b. Providing ingress and egress and positioning the animal in proper orientation relative to the basin, and
c. Functioning as a deflector to prevent scattering of the litter and waste under conditions of normal use.

SUMMARY OF THE INVENTION

The present invention provides a litter and waste receptacle for indoor use by cats and other small pet animals. It comprises three component parts: a basin, a cover on the basin and a liner in the basin. The liner is itself a basin-shaped receptacle, removable from the basin, disposable and replaceable. The liner not only prevents soiling of the basin, but it also prevents soiling of the hands. It is removed, contents and all, from the basin and discarded as conventional household garbage without manual contact with the litter or waste.

The cover is detachably secured to the basin and it also functions as a fastening or clamping means to detachably secure the liner to the basin. The basin, liner and cover are, preferably, elliptically shaped, all three oriented in the same manner. The cover is provided with an elliptical opening for ingress and egress and to position the animal in proper orientation relative to the basin and its liner. Proper positioning is important while the animal performs its bodily functions; it is also important when the animal subsequently scrapes the litter to cover the waste. The latter performance generally entails scattering of the litter, and sometimes of the waste, and the cover provides deflecting means to prevent scattering of the material out of the basin.

DESCRIPTION OF PREFERRED EMBODIMENT OF THE INVENTION

Figure 1:
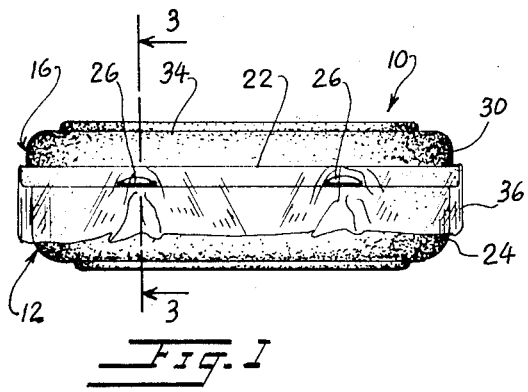
FIG. 1 is a side view of an assembled litter and waste receptacle made in accordance with a preferred form of the present invention.
Figure 2:
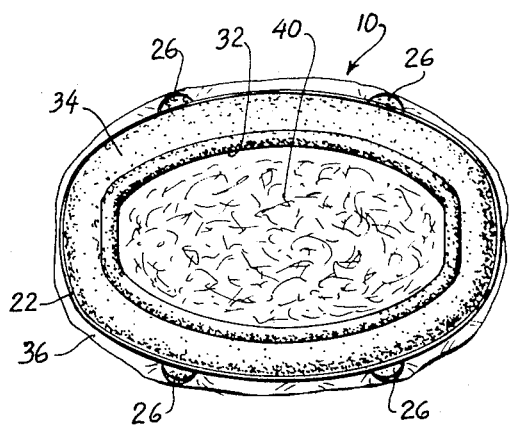
FIG. 2 is a top view thereof.
Figure 3:
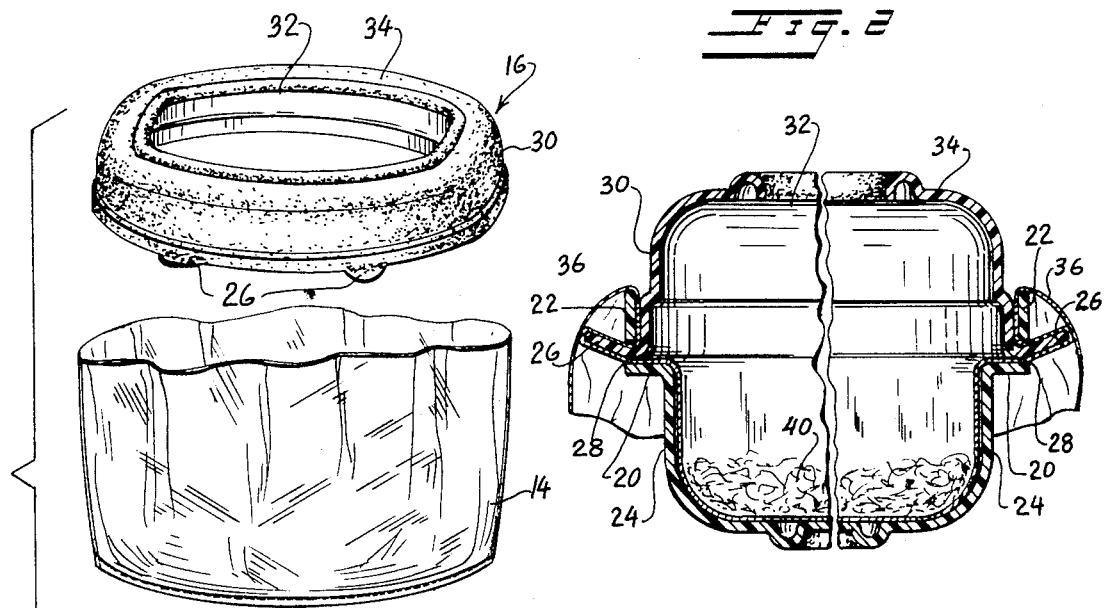
FIG. 3 is an enlarged fragmentary vertical section on the line 3—3 of FIG. 1.
Figure 4:
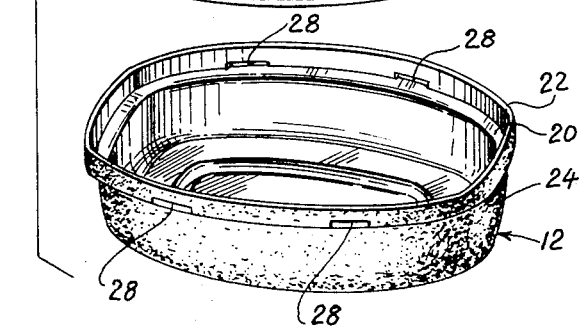
FIG. 4 is an exploded perspective view showing the component parts of the litter and waste receptacle of FIG. 1.

The litter and waste receptacle 10 which is shown in the drawing comprises three basic components: a basin 12, a liner 14 for said basin, and a cover 16 therefor.

Basin 12 is a one-piece, seamless plastic molding made, for example, of high impact polystyrene. It may be made by vacuum forming or any other suitable process. In plan view, the basin is elliptically shaped, and its dimensions — major axis, minor axis, depth — are matters of judgment and design, taking into account the type and size of animal for which the article is intended.

Formed along the upper peripheral edge of the basin is a rabbet formation consisting of a continuous horizontal ledge 20 and a continuous vertical flange 22 adjoining said ledge along the entire periphery of the basin. In the preferred form of the invention, the horizontal ledge and vertical flange are formed outwardly of the vertical wall 24 of the basin.

Cover 16 may also be molded in the manner and of the material above mentioned in connection with the basin. It is of inverted basin shape, also elliptical in plan view. Its bottom peripheral edge is adapted to rest on ledge 20 and to be confined there by flange 22. It will now be noted that interlocking means are provided between the basin and its cover. In the illustrated form of the invention, the interlocking means consist of a plurality of lugs 26 which extend outwardly from the lower edge of the cover, and registering slots 28 for said lugs formed in flange 22 along the line of junction between said flange and ledge 20. When lugs 26 are inserted into slots 28, the cover is attached to the basin. To remove the cover from the basin, the side wall 30 of the cover is flexed inwardly to disengage the lugs from their respective slots.

It will also be seen that an opening 32 is formed in the top wall 34 of the cover. In plan view this opening has an elliptical configuration, its major and minor axes coinciding, respectively, with the major and minor axes of the cover proper and the basin. Opening 32 provides ingress and egress with respect to the basin, and its elliptical shape tends to cause the animal using the device to position itself in proper orientation relative to the basin while performing its bodily functions. More particularly, the elliptical shape of opening 32 causes the animal to assume a forward-to-rearward position coinciding with the major axes of the opening, cover and basin.

Referring now to liner 14, it will be understood that it is made of relatively flexible, disposable material, such as polyethylene film, and, in the preferred form of the invention, it is basin-shaped to conform to the shape of basin 12. The liner is, however, deeper than the basin, so that the upper end 36 of the liner may be folded over the upper end of the basin, that is, over ledge 20 and flange 22. When the cover is placed on the basin, lugs 26 engage corresponding portions of the liner and press them into slots 28. This locks both the cover and the liner to the basin.

Litter 40 may be placed in liner 14 either before or after the cover is secured to the basin. The cover is, however, secured to the basin before the device is put to use. After use, litter 40 contains animal waste, and the process of disposing of same reverses the procedure above described. The cover is removed first and then the liner is removed with its litter and waste content. A replacement liner may then be installed in the basin, and the cover is then replaced on the basin. After a new supply of litter material is deposited on the liner, the device is again ready for use.

The foregoing is descriptive of a preferred form of the present invention and it will be understood that modifications may be incorporated therein within the broad scope of the appended claims.

I claim:

1. A litter and waste receptacle for small pet animals, comprising:
   a. a basin,
   b. a liner in said basin,
   c. said liner having the configuration, and performing the function, of a receptacle for litter and waste, and
   d. a cover on said basin,
   e. said cover having an opening formed therein to provide ingress and egress with respect to said liner-containing basin,
   f. said cover having the configuration, and performing the function, of an overhanging deflector to prevent scattering of the litter and waste under conditions of normal use,
   g. said liner being removably and replaceably disposed in the basin,
   h. the main body of the liner being adapted to line the basin, and upper marginal portions of the liner extending upwardly and outwardly between the basin and the cover,
   i. said marginal portions of the liner being clamped between the basin and the cover to hold the main body of the liner in place in the basin under conditions of normal use,
   j. said cover being removably and replaceably mounted on the basin, and
   k. securing means being provided between the cover and the basin to attach the cover to the basin,
   l. said securing means also engaging said marginal portions of the liner and thereby securing the liner to the basin,
   m. said securing means consisting of inter-engaging laterally extending lugs and lug-receiving openings,
   n. said lugs and lug-receiving openings being adapted to engage the marginal portions of the liner to hold said liner in place in the basin.

2. A litter and waste receptacle in accordance with claim 1, wherein:
   a. the basin and cover are elliptically shaped, in plan view, and
   b. the opening in the cover is also elliptically shaped in plan view,
   c. the eliptically shaped cover, basin and opening being identically oriented,
   d. whereby the eliptically shaped opening in the cover is adapted to position an animal in proper orientation relative to the basin.

3. A litter and waste receptacle in accordance with claim 1, wherein:
   a. the liner comprises a basin-shaped receptacle for litter and waste,
   b. said liner having a depth greater than that of the basin,
   c. whereby the upper end of the liner is foldable over the upper edge of the basin to support the liner thereon,
   d. said liner being removable from the basin to remove the litter and waste therefrom.

4. A litter and waste receptacle in accordance with claim 1, wherein:
   a. a rabbeted upper edge is provided on the basin supporting the lower edge of the cover and the upper marginal portions of the liner,
   b. said lugs being formed on said lower edge of the cover, and
   c. said lug-receiving openings formed in said rabbeted upper edge of the basin to engage said lugs,
   d. said cover and said basin being sufficiently flexible for relative flexing movement between them to disengage the lugs from the lug-receiving openings.

* * * * *